(12) United States Patent
Sato et al.

(10) Patent No.: US 9,154,718 B2
(45) Date of Patent: Oct. 6, 2015

(54) SOLID STATE IMAGING DEVICE

(71) Applicant: Kabushiki Kaisha Toshiba, Minato-ku (JP)

(72) Inventors: Maki Sato, Kanagawa (JP); Kazuki Hizu, Kanagawa (JP); Tetsuya Amano, Chiba (JP); Katsuya Kudo, Kanagawa (JP); Toyoharu Igarashi, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/530,899

(22) Filed: Nov. 3, 2014

(65) Prior Publication Data

US 2015/0049227 A1 Feb. 19, 2015

Related U.S. Application Data

(62) Division of application No. 13/278,587, filed on Oct. 21, 2011, now abandoned.

(30) Foreign Application Priority Data

Jan. 19, 2011 (JP) .................................. 2011-008876

(51) Int. Cl.
| | |
|---|---|
| H04N 5/217 | (2011.01) |
| H04N 5/208 | (2006.01) |
| H04N 5/363 | (2011.01) |
| H04N 5/357 | (2011.01) |
| H04N 5/376 | (2011.01) |
| H04N 5/365 | (2011.01) |
| H04N 3/14 | (2006.01) |
| H04N 1/58 | (2006.01) |
| H04N 1/409 | (2006.01) |
| G06K 9/40 | (2006.01) |
| H04N 1/00 | (2006.01) |
| H04N 5/378 | (2011.01) |

(Continued)

(52) U.S. Cl.
CPC .......... *H04N 5/3765* (2013.01); *H04N 1/00978* (2013.01); *H04N 5/3575* (2013.01); *H04N 5/365* (2013.01); *H04N 5/378* (2013.01); *H04N 5/3572* (2013.01)

(58) Field of Classification Search
USPC .............. 348/241, 243, 244; 250/238, 370.15
See application file for complete search history.

(56) References Cited

U.S. PATENT DOCUMENTS

| | | | | |
|---|---|---|---|---|
| 5,045,928 | A | * | 9/1991 | Takaiwa et al. ............ 348/227.1 |
| 7,648,271 | B2 | * | 1/2010 | Doorenbos et al. ........... 374/178 |

(Continued)

FOREIGN PATENT DOCUMENTS

| | | |
|---|---|---|
| JP | 2007-329655 | 12/2007 |
| JP | 2008-141595 | 6/2008 |
| JP | 2008-236158 | 10/2008 |

*Primary Examiner* — Sinh Tran
*Assistant Examiner* — Mark Monk
(74) *Attorney, Agent, or Firm* — Oblon, McClelland, Maier & Neustadt, L.L.P.

(57) ABSTRACT

According to one embodiment, a solid state imaging device includes an image CDS processing unit that outputs a pixel signal based on a difference between a pixel voltage read from a pixel during a reset period and a pixel voltage read from the pixel during a signal read period, a temperature sensor that outputs a diode voltage when a diode current is changed, a temperature CDS processing unit that outputs a temperature measurement value based on a difference of the diode voltage at the time when the diode current is changed, and a timing generator that controls the reset period, the signal read period, and timing of changing the diode current of the temperature sensor.

18 Claims, 10 Drawing Sheets

(56) References Cited

U.S. PATENT DOCUMENTS

2003/0107661 A1* 6/2003 Pahr et al. ............... 348/244
2005/0270413 A1 12/2005 Hatano et al.
2006/0087571 A1* 4/2006 Nam ....................... 348/246
2009/0009635 A1* 1/2009 Maeda et al. ............ 348/241

* cited by examiner

SOLID STATE IMAGING DEVICE

CROSS-REFERENCE TO RELATED APPLICATIONS

This application is a division of and claims the benefit of priority under 35 U.S.C. §120 from U.S. Ser. No. 13/278,587 filed Oct. 21, 2011, and claims the benefit of priority under 35 U.S.C. §119 from Japanese Patent Application No. 2011-008876 filed Jan. 19, 2011; the entire contents of each of which are incorporated herein by reference.

FIELD

Embodiments described herein relate generally to a solid state imaging device.

BACKGROUND

In a solid state imaging device, noise and defects in a captured image may become obvious as temperature increases, or distortion may occur in a captured image due to variation of temperature. Therefore, a temperature sensor is mounted in a solid state imaging device and an image signal is corrected based on the temperature of the solid state imaging device.

Conventionally, there is an imaging element circuit and an A/D conversion circuit for an imaging element, and in addition to the imaging element circuit, there are a diode used as a temperature sensor and an A/D conversion circuit for the temperature sensor. Specifically, a circuit block related to temperature measurement is present independently of a signal processing circuit block for the imaging element, and correction is performed in a temperature correction circuit in a later stage by using stored temperature measurement data.

When a diode is used as a temperature sensor, current-voltage characteristics of the diode cannot be represented by a linear approximate equation. In other words, current and voltage are not in a proportional relationship, so measurement accuracy is insufficient when using a method of obtaining temperature from the current-voltage characteristics of the diode.

DETAILED DESCRIPTION

A solid state imaging device according to one embodiment is provided with a pixel array unit, an image CDS processing unit, a temperature sensor, a temperature CDS processing unit, and a timing generator. In the pixel array unit, pixels which accumulate photoelectrically-converted charge are arranged in a matrix form. The image CDS processing unit outputs a pixel signal based on a difference between a pixel voltage read from the pixel during a reset period and a pixel voltage read from the pixel during a signal read period. The temperature sensor outputs a diode voltage when a diode current is changed. The temperature CDS processing unit outputs a temperature measurement value based on a difference of the diode voltage at the time when a diode current is changed. The timing generator controls the reset period, the signal read period, and the timing of changing the diode current of the temperature sensor.

Hereinafter, exemplary embodiments of a temperature measurement device and a solid state imaging device will be explained below in detail with reference to the accompanying drawings. The present invention is not limited to the following embodiments.

First Embodiment

Figure 1:
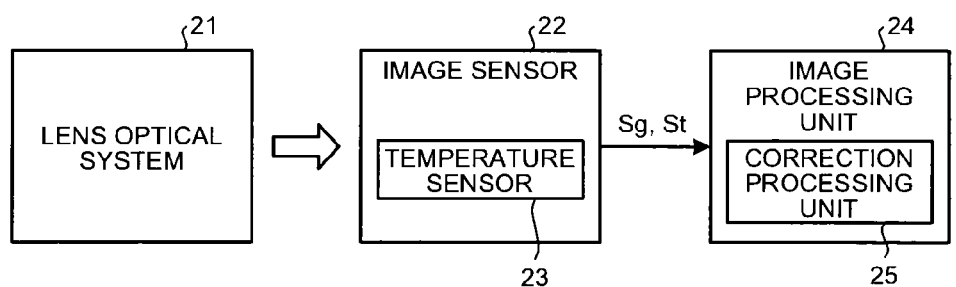
FIG. 1 is a block diagram illustrating a schematic configuration of an image processing unit to which a solid state imaging device according to a first embodiment is applied.

FIG. 1 is a block diagram illustrating a schematic configuration of an image processing unit to which a solid state imaging device according to a first embodiment is applied.

Figure 2:
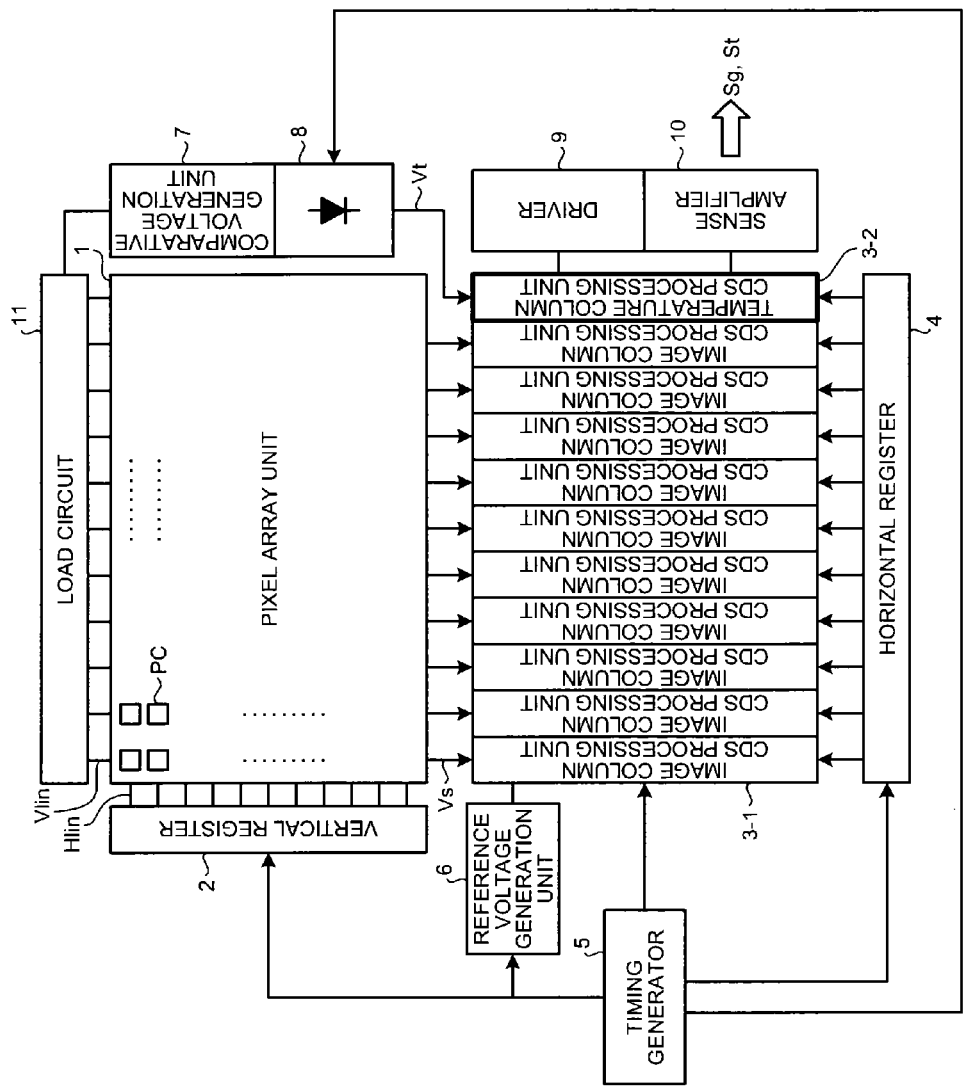
FIG. 2 is a block diagram illustrating a schematic configuration of the solid state imaging device according to the first embodiment.
Figure 11:
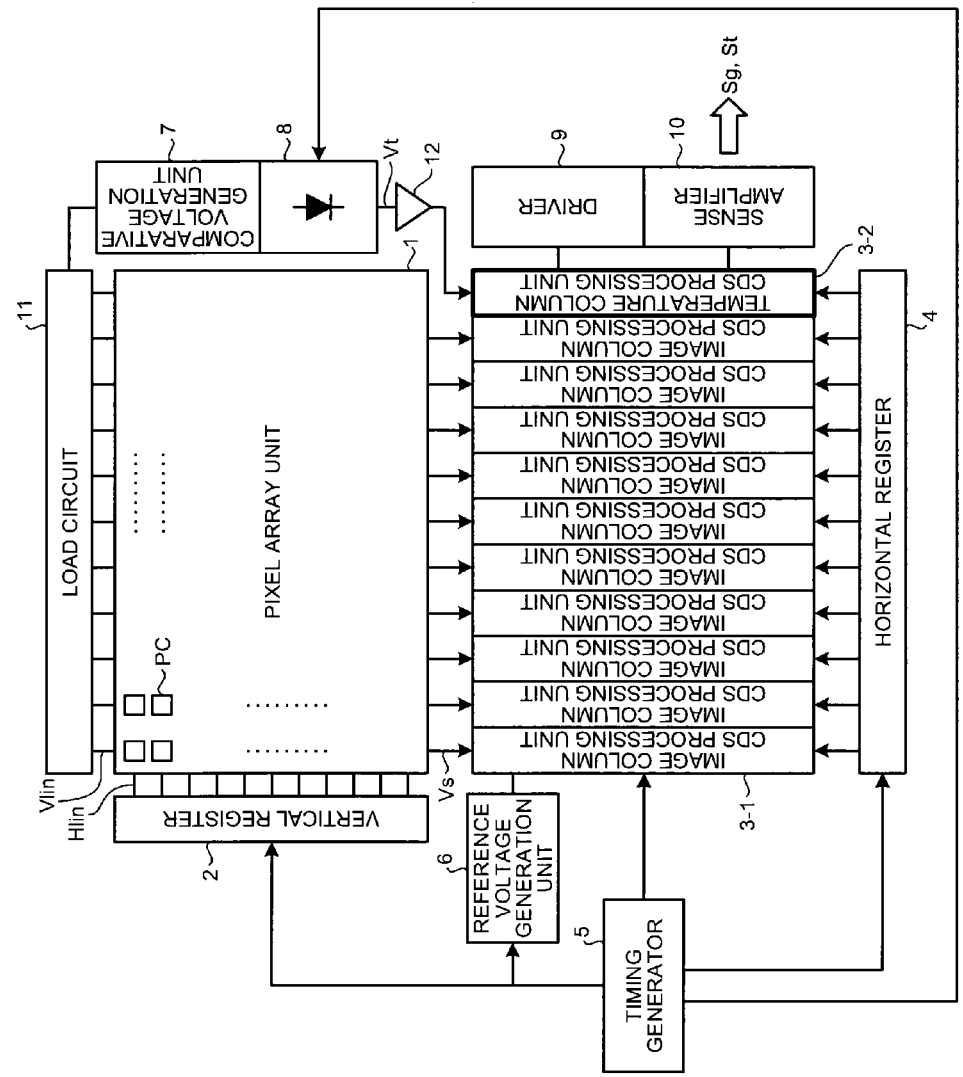
FIG. 11 is a block diagram illustrating a schematic configuration of a solid state imaging device according to a fourth embodiment.
Figure 12:
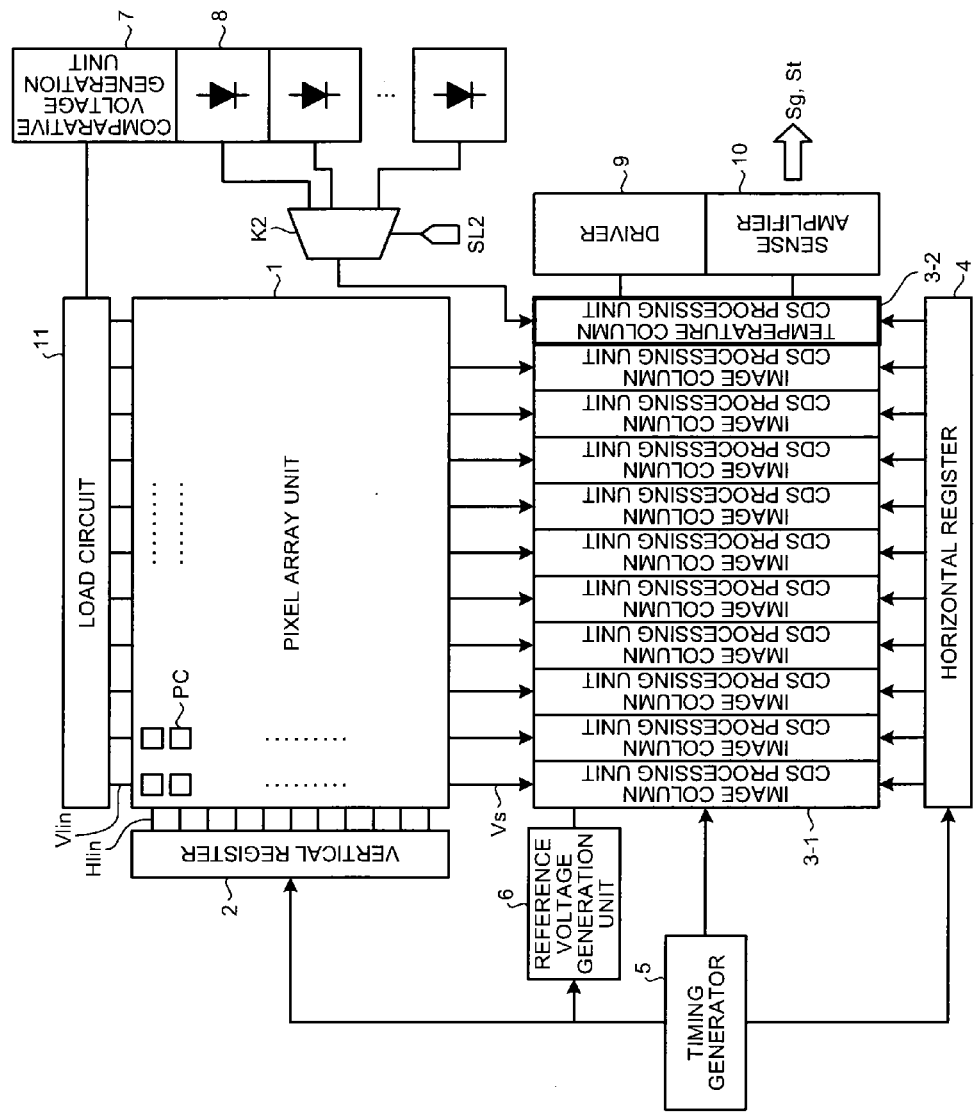
FIG. 12 is a block diagram illustrating a schematic configuration of a solid state imaging device according to a fifth embodiment.

FIG. 1 illustrates that a lens optical system 21 is provided in the previous stage of an image sensor 22, and an image processing unit 24 is provided in the later stage of the image sensor 22. A temperature sensor 23, which outputs a diode voltage when a diode current is changed, is mounted in the image sensor 22. The image processing unit 24 is provided with a correction processing unit 25 which performs correction processing of a pixel signal Sg on the basis of a temperature measurement value St. A solid state imaging device as illustrated in FIG. 2, 11, or 12 can be used as the image sensor 22.

When light enters the image sensor 22 through the lens optical system 21, the pixel signal Sg according to an amount of the light is generated. At the same time, the temperature measurement value St is calculated on the basis of a difference of the diode voltage outputted from the temperature sensor 23 and transmitted to the image processing unit 24. The correction processing unit 25 performs correction processing of the pixel signal Sg on the basis of the temperature measurement value St and image processing of the pixel signal Sg, on which the correction processing is performed.

The correction processing of the pixel signal Sg can eliminate, for example, distortion of the pixel signal Sg due to variation of the refractive index and size of the lens optical system 21 caused by variation of temperature as well as fixed pattern noise and white spots due to dark current of a photodiode PD.

Examples of the image processing of the pixel signal Sg include shading compensation, color separation interpolation processing, masking processing, γ correction processing, color space conversion processing, brightness adjustment, contrast adjustment, color adjustment, and intensity adjustment.

FIG. 2 is a block diagram illustrating a schematic configuration of the solid state imaging device according to the first embodiment.

FIG. 2 illustrates that the solid state imaging device is provided with a pixel array unit 1 in which pixels PC that accumulate photoelectrically-converted charge are arranged in a matrix form in a row direction and a column direction, a vertical register 2 which scans the pixels PC to be read in a vertical direction, a temperature sensor 8 which outputs a diode voltage when a diode current is changed, a comparative voltage generation unit 7 which generates a comparative voltage to be a base of the diode current of the temperature sensor 8, image column CDS processing units 3-1 which output a pixel signal Sg based on a difference between a pixel voltage Vs read from the pixel PC during a reset period and a pixel voltage Vs read from the pixel PC during a signal read period, a temperature column CDS processing unit 3-2 which outputs a temperature measurement value St based on a difference of the diode voltage when the diode current of the temperature sensor 8 is changed, a horizontal register 4 which scans the pixels PC to be read and the temperature sensor 8 in a horizontal direction, a timing generator 5 which controls the reset period of the pixels PC, the signal read period, and the timing of changing the diode current of the temperature sensor 8, a reference voltage generation unit 6 which outputs a reference voltage VF to the image column CDS processing units 3-1 and the temperature column CDS processing unit 3-2, a driver 9 which drives the image column CDS processing units 3-1 and the temperature column CDS processing unit 3-2, a sense amplifier 10 which detects signals outputted from the image column CDS processing units 3-1 and the temperature column CDS processing unit 3-2, and a load circuit 11 which causes potentials of vertical signal lines Vlin to follow the signals read from the pixels PC.

The temperature sensor 8 and the pixel array unit 1 can be mounted on the same semiconductor chip. A ramp wave can be used as the reference voltage VF outputted from the reference voltage generation unit 6. A band-gap reference circuit can be used as the comparative voltage generation unit 7.

Here, in the pixel array unit 1, horizontal control lines Hlin that control reading of the pixels PC are provided in the row direction and vertical signal lines Vlin that transfer signals read from the pixels PC are provided in the column direction.

The pixels PC are scanned in the vertical direction by the vertical register 2, so that the pixels PC in the row direction are selected and the pixel voltages Vs read from the pixels PC are transmitted to the image column CDS processing units 3-1 via the vertical signal lines Vlin. Here, in the load circuit 11, a source follower is formed between the load circuit 11 and the pixels PC when the signals are read from the pixels PC, so that the potentials of the vertical signal lines Vlin follow the pixel voltages Vs read from the pixels PC.

In each image column CDS processing unit 3-1, the pixel voltage Vs read from a pixel PC during the reset period and the pixel voltage Vs read from the pixel PC during the signal read period are sampled and a difference between them is calculated, so that a signal component of each pixel PC is digitalized by CDS and outputted as the pixel signal Sg through the sense amplifier 10.

On the other hand, a diode voltage Vt read from the temperature sensor 8 is transmitted to the temperature column CDS processing unit 3-2. Then, in the temperature column CDS processing unit 3-2, the diode voltage Vt read before the diode current is changed and the diode voltage Vt read after the diode current is changed are sampled and a difference between them is calculated, so that a signal component of the temperature sensor 8 is digitalized by the CDS and outputted as the temperature measurement value St through the sense amplifier 10.

Here, the temperature measurement value St is obtained from the difference of the diode voltage Vt before and after the diode current is changed, so that it is possible to eliminate temperature dependence of the current-voltage characteristics of the diode and improve accuracy of the temperature measurement.

Although, in the embodiment of FIG. 2, a method is described in which the temperature column CDS processing unit 3-2 is provided separately from the image column CDS processing units 3-1, the temperature column CDS processing unit 3-2 may be integrated with the image column CDS processing units 3-1. In this case, the image column CDS processing unit 3-1 can be switched between the pixels PC and the temperature sensor 8. For example, the image column CDS processing units 3-1 are switched to the pixels PC during an effective pixel period and the image column CDS processing units 3-1 are switched to the temperature sensor 8 during a vertical blanking period, so that it is possible to obtain the temperature measurement value St at least once in one frame period without causing a loss of the pixel signal Sg.

Although, in the embodiment of FIG. 2, a method is described in which the temperature sensor 8 is mounted in the solid state imaging device, the temperature sensor 8 may be used independently as a temperature measurement device. In this case, the temperature column CDS processing unit 3-2 may be mounted in the temperature measurement device along with the temperature sensor 8.

Although, in the embodiment of FIG. 2, a method is described in which the pixel signal Sg and the temperature measurement value St are digitalized in the temperature column CDS processing unit 3-2 and the image column CDS processing units 3-1, it is possible to output the pixel signal Sg and the temperature measurement value St as analog signals without change and digitalize them outside the solid state imaging device as needed.

Figure 3:
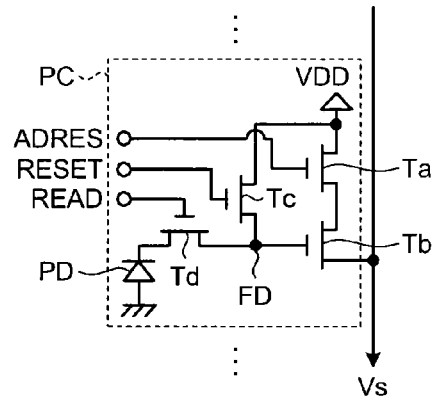
FIG. 3 is a circuit diagram illustrating a configuration example of a pixel PC in FIG. 2.

FIG. 3 is a circuit diagram illustrating a configuration example of the pixel PC in FIG. 2.

FIG. 3 illustrates that the pixel PC is provided with a photodiode PD, a row selection transistor Ta, an amplifier transistor Tb, a reset transistor Tc, and a read transistor Td. A floating diffusion FD is formed at a connection point of the amplifier transistor Tb, the reset transistor Tc, and the read transistor Td as a detection node.

In the pixel PC, the source of the read transistor Td is connected to the photodiode PD and a read signal READ is inputted into the gate of the read transistor Td. The source of the reset transistor Tc is connected to the drain of the read transistor Td, a reset signal RESET is inputted into the gate of the reset transistor Tc, and the drain of the reset transistor Tc is connected to a power supply potential VDD. A row selection signal ADRES is inputted into the gate of the row selection transistor Ta and the drain of the row selection transistor Ta is connected to the power supply potential VDD. The source of the amplifier transistor Tb is connected to the vertical signal line Vlin, the gate of the amplifier transistor Tb is connected to the drain of the read transistor Td, and the drain of the amplifier transistor Tb is connected to the source of the row selection transistor Ta. The horizontal control lines Hlin in FIG. 2 can transmit the read signal READ, the reset signal RESET, and the row selection signal ADRES to the pixels PC for each row.

Figure 4:
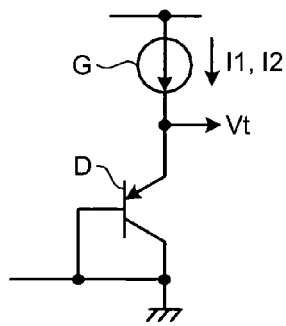
FIG. 4 is a circuit diagram illustrating a configuration example of a temperature sensor 8 in FIG. 2.

FIG. 4 is a circuit diagram illustrating a configuration example of the temperature sensor 8 in FIG. 2. In FIG. 4, the temperature sensor 8 is provided with a diode D and a current source G, and the current source G is connected to the diode D in series. As the diode D, for example, a bipolar transistor whose collector and base are connected to each other can be used. The current source G can switch between a current I1 and a current I2 and output one of them. The current I2 can be larger than the current I1. The timing generator 5 in FIG. 2 can switch to the current I1 during the reset period of the pixels PC and switch to the current I2 during the signal read period of the pixels PC.

Here, when the diode D is used as the temperature sensor 8, the diode voltage Vt with respect to the diode current I1 is measured from the current-voltage characteristics of the diode D. Temperature can be read from the diode voltage Vt by assuming that the diode voltage Vt is proportional to temperature.

At this time, the diode current I1 can be given by the following formula (1).

$$I1 = Is * \exp(qVt/kBT) \quad (1)$$

Here, Is is reverse current, T is temperature (temperature unit is Kelvin), kB is a Boltzmann constant ($=8.62*10^{-5}$ eV/K), and q is an amount of charge ($=1.602*10^{-19}$ Coulomb).

When the formula (1) is expanded, the following formula (2) can be obtained.

$$Vt = kBT/q \cdot \ln(I1/Is) \quad (2)$$

If T is 300 K (27° C.), kBT/q is a constant of 0.0259 (V). In other words, if kB, q, and Is are constants, the temperature T can be obtained from the current-voltage characteristics, which are a relationship between Vt and I1 of the formula (2).

However, strictly speaking, the reverse current Is has a temperature dependence, and the current-voltage characteristics of the diode D is technically nonlinear with respect to the temperature T. Here, the temperature measurement value St is obtained from the difference of the diode voltage Vt when the diode current is switched from I1 to I2, so that it is possible to eliminate the temperature dependence of the current-voltage characteristics of the diode and improve accuracy of the temperature measurement.

Figure 5:
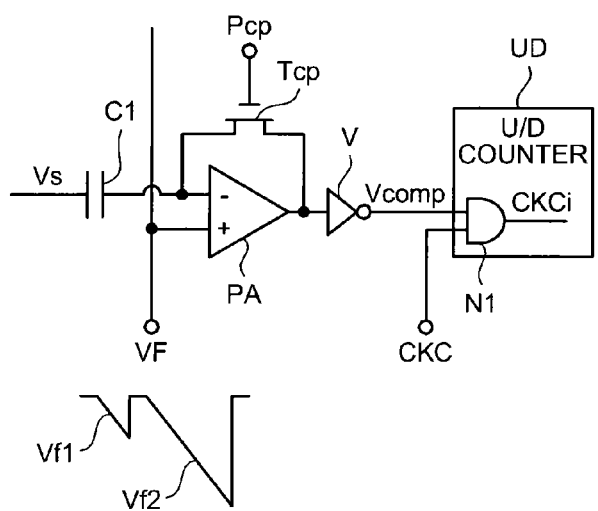
FIG. 5 is a circuit diagram illustrating a configuration example of an image column CDS processing unit 3-1 in FIG. 2.

FIG. 5 is a circuit diagram illustrating a configuration example of the image column CDS processing unit 3-1 in FIG. 2.

In FIG. 5, an image column ADC3a is provided with a capacitor C1, a comparator PA, a switch transistor Tcp, an inverter V, and an up/down counter UD for each column. The up/down counter UD is provided with a logical AND circuit N1.

The vertical signal line Vlin is connected to the inverting input terminal of the comparator PA via the capacitor C1, and the reference voltage VF is inputted into the noninverting input terminal of the comparator PA. The switch transistor Tcp is connected between the inverting input terminal and output terminal of the comparator PA. The output terminal of the comparator PA is connected to one input terminal of the logical AND circuit N1, and a reference clock CKC is inputted into the other input terminal of the logical AND circuit N1.

When the row selection signal ADRES is low level, the row selection transistor Ta is in an off state and does not perform a source follower operation, so that no signal is outputted to the vertical signal line Vlin. At this time, if the read signal READ and the reset signal RESET become high level, the read transistor Td turns on, and charge accumulated in the photodiode PD is discharged to the floating diffusion FD. Then, the charge is discharged to the power supply potential VDD through the reset transistor Tc.

After the charge accumulated in the photodiode PD is discharged to the power supply potential VDD, when the read signal READ becomes low level, accumulation of effective signal charge is started in the photodiode PD.

Next, when the row selection signal ADRES becomes high level, the row selection transistor Ta of the pixel PC turns on and the power supply potential VDD is applied to the drain of the amplifier transistor Tb, so that a source follower is formed by the amplifier transistor Tb and the load circuit 11.

Next, when the reset signal RESET rises, the reset transistor Tc turns on, and excess charge generated in the floating diffusion FD by leakage current or the like is reset. A voltage according to a reset level of the floating diffusion FD is applied to the gate of the amplifier transistor Tb.

If a reset pulse Pcp is applied to the gate of the switch transistor Tcp while the pixel voltage Vs according to the reset level is outputted to the vertical signal line Vlin, an input voltage of the inverting input terminal of the comparator PA is clamped by the output voltage and an operating point is set. At this time, a difference between the pixel voltage Vs and the vertical signal line Vlin is held by the capacitor C1 and the input voltage of the comparator PA is set to zero.

After the switch transistor Tcp turns off, while the pixel voltage Vs at the reset level is inputted into the comparator PA via the capacitor C1, a ramp wave Vf1 is provided as the reference voltage VF, and the pixel voltage Vs at the reset level and the ramp wave Vf1 are compared. The output voltage of the comparator PA is inverted by the inverter V, and then inputted into one input terminal of the logical AND circuit N1 as an output voltage Vcomp.

The reference clock CKC is inputted into the other input terminal of the logical AND circuit N1. When the pixel voltage Vs at the reset level is smaller than a level of the ramp wave Vf1, the output voltage Vcomp becomes high level. Therefore, the reference clock CKC passes through the logical AND circuit N1, and the reference clock CKCi having passed through the logical AND circuit N1 is down-counted by the up/down counter UD.

When the pixel voltage Vs at the reset level corresponds to the level of the ramp wave Vf1, the output voltage of the comparator PA falls and the output voltage Vcomp becomes low level. Therefore, the reference clock CKC is cut off by the logical AND circuit N1, and down-counting is stopped in the up/down counter UD, so that the pixel voltage Vs at the reset level is digitalized.

Next, when the read signal READ rises, the read transistor Td turns on, the charge accumulated in the photodiode PD is transferred to the floating diffusion FD, and a voltage according to a signal level of the floating diffusion FD is applied to the gate of the amplifier transistor Tb.

While the pixel voltage Vs at the signal level is inputted into the comparator PA via the capacitor C1, a ramp wave Vf2 is provided as the reference voltage VF, and the pixel voltage Vs at the signal level and the ramp wave Vf2 are compared. The output voltage of the comparator PA is inverted by the inverter V, and then inputted into one input terminal of the logical AND circuit N1 as the output voltage Vcomp.

When the pixel voltage Vs at the signal level is smaller than a level of the ramp wave Vf2, the output voltage Vcomp becomes high level. Therefore, the reference clock CKC passes through the logical AND circuit N1, and the reference clock CKCi having passed through the logical AND circuit N1 is up-counted by the up/down counter UD. When the pixel voltage Vs at the signal level corresponds to the level of the ramp wave Vf2, the output voltage of the comparator PA falls and the output voltage Vcomp becomes low level. Therefore, the reference clock CKC is cut off by the logical AND circuit N1, and up-counting is stopped in the up/down counter UD, so that a difference between the pixel voltage Vs at the signal level and the pixel voltage Vs at the reset level is digitalized.

The temperature column CDS processing unit 3-2 can be formed in the same manner as the image column CDS processing unit 3-1 in FIG. 5. In this case, the diode voltage Vt when the diode current of the diode D in FIG. 4 is set to the current I1 is inputted instead of the pixel voltage Vs at the reset level. Then, the diode voltage Vt when the diode current is set to the current I1 is compared with the ramp wave Vf1. Further, the diode voltage Vt when the diode current of the diode D in FIG. 4 is set to the current I2 is inputted instead of the pixel voltage Vs at the signal level. Then, the diode voltage Vt when the diode current is set to the current I2 is compared with the ramp wave Vf2.

Figure 6:
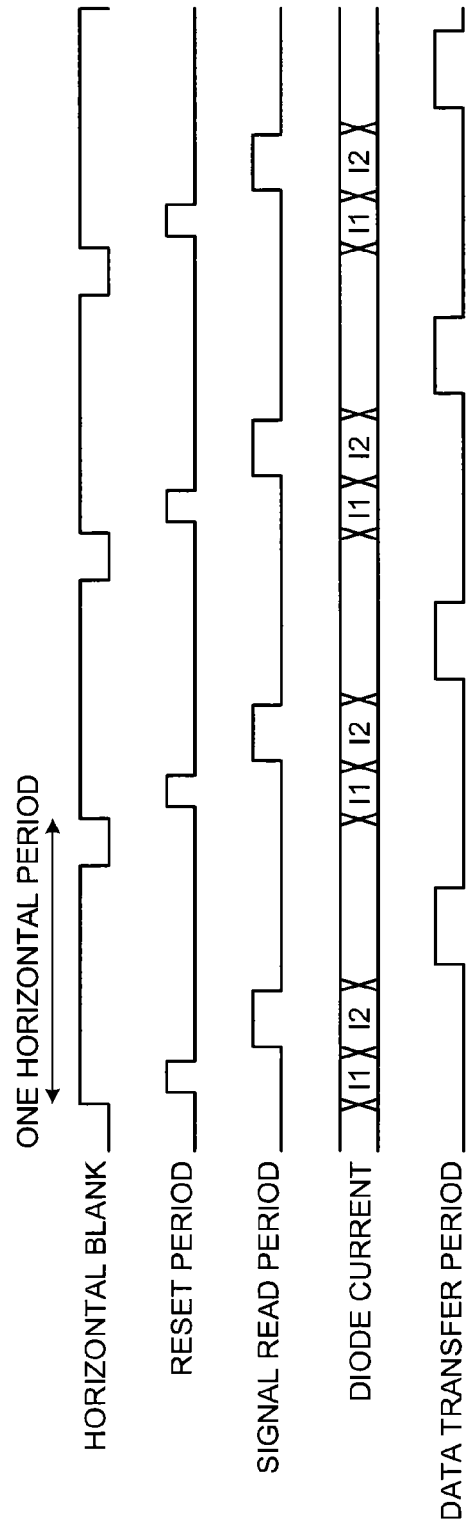
FIG. 6 is a timing chart illustrating a temperature measurement operation of the solid state imaging device in FIG. 2.

FIG. 6 is a timing chart illustrating the temperature measurement operation of the solid state imaging device in FIG. 2.

In FIG. 6, a reset period, a signal read period, and a data transfer period are provided in one horizontal period. The diode current is set to I1 in the reset period, and the diode current is set to I2 in the signal read period. In the temperature column CDS processing unit 3-2 in FIG. 2, the diode voltage Vt when the diode current is set to I1 is sampled, and then the diode voltage Vt when the diode current is set to I2 is sampled. Then, the temperature measurement value St is calculated on the basis of a difference between these diode voltages Vt, and the temperature measurement value St is outputted in the data transfer period via a data transfer bus in which the pixel signal Sg is outputted.

Here, when the current I2 is changed to K times the current I1 (K is a real number greater than or equal to 1), the current I2 can be given by the following formula (3).

$$I2 = I1 * K \quad (3)$$

A voltage difference value ΔVt of the diode voltage Vt when the diode current is switched from I1 to I2 can be given by the following formula (4) from the formula (2).

$$\begin{aligned}\Delta Vt &= kBT/q \cdot \ln(I1/Is) - kBT/q \cdot \ln(I2/Is) \\ &= kBT/q \cdot \ln(I1/I2) \\ &= kBT/q \cdot \ln(I2*K/I2) \\ &= kBT/q \cdot \ln(K)\end{aligned} \quad (4)$$

When the voltage difference value ΔVt is obtained from the formula (4), the reverse current Is depending on temperature is cancelled, so that it is possible to eliminate the temperature dependence of the current-voltage characteristics of the diode D and improve accuracy of the temperature measurement.

For example, when K is set to 8, as shown in the following formula (5), the voltage difference value ΔVt is represented by a linear approximate equation of the temperature T, and a voltage change rate per degree is 0.18 mV/° C.

$$\Delta Vt = kB/q \cdot \ln(K) \cdot T = 0.0259*\ln(8)*(T/300) = \\ 0.0259*2.079*(T/300) = 0.00018*T(V) \quad (5)$$

Figure 7:
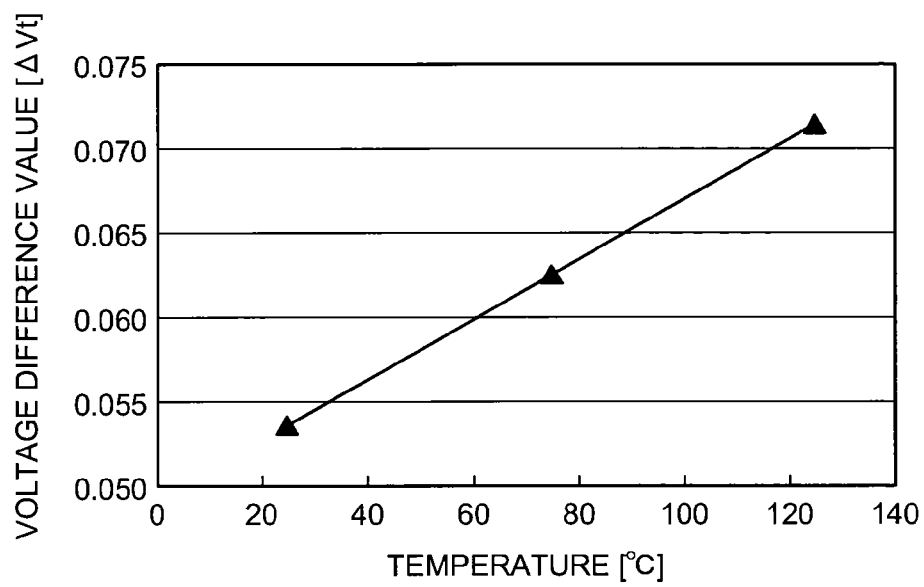
FIG. 7 is a diagram illustrating a relationship between a voltage difference value $\Delta Vt$ and temperature.

FIG. 7 is a diagram illustrating a relationship between the voltage difference value ΔVt and temperature.

In FIG. 7, the voltage difference value ΔVt with respect to the temperature T in the formula (5) is graphed. As obvious from the formula (5), the relationship between the temperature T and the voltage difference value ΔVt is linear.

Therefore, the temperature can be accurately measured from the current-voltage characteristics of the diode D, and if code values of temperature table are calculated in advance, temperature can be read from the temperature measurement value St. It is possible to perform difference processing of the diode voltage Vt within one horizontal period and output the temperature measurement value St, so that it is possible to surely perform temperature measurement once within one vertical period (also referred to as "one frame period").

Figure 8:
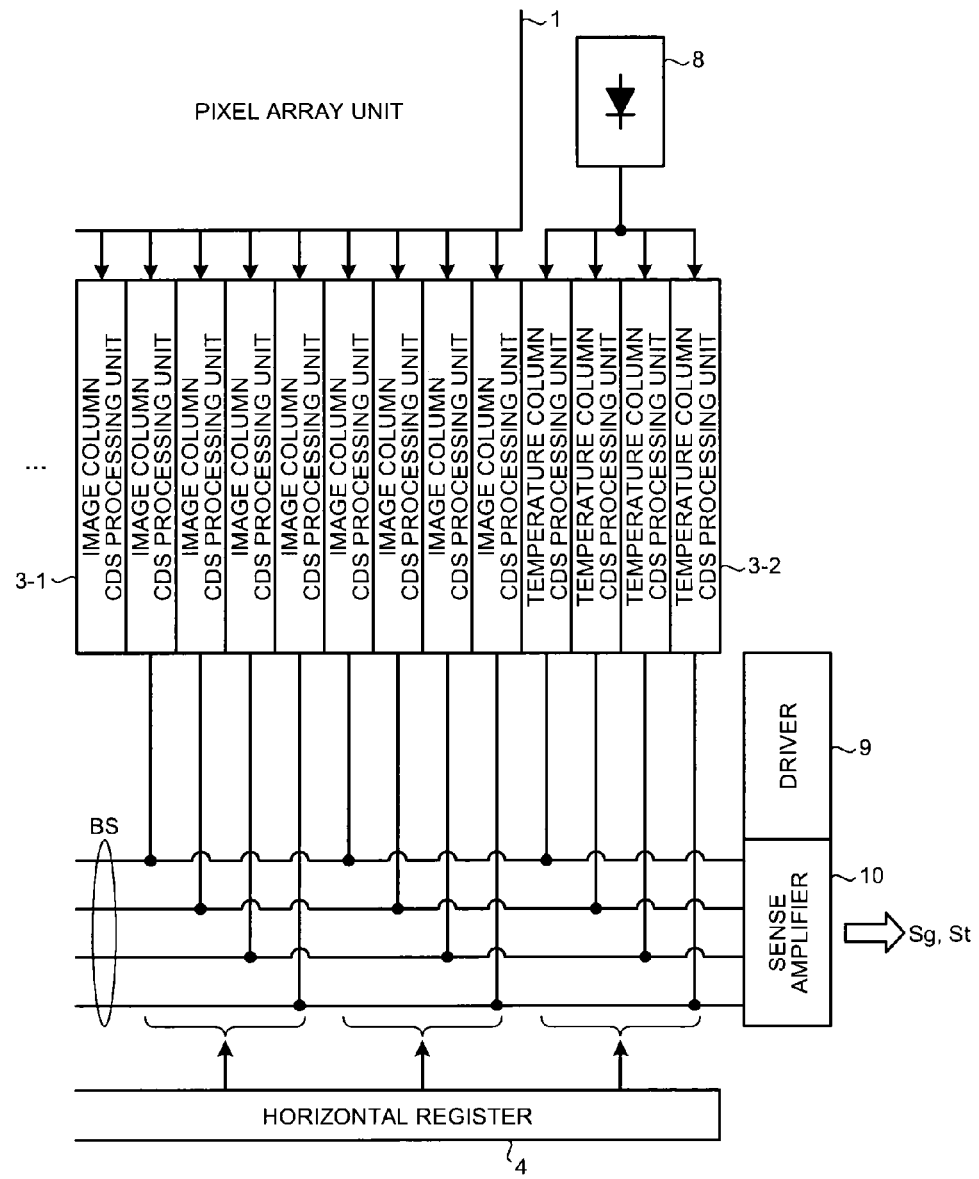
FIG. 8 is a block diagram illustrating an example of a method for transferring a pixel signal Sg and a temperature measurement value St of the solid state imaging device.

FIG. 8 is a block diagram illustrating a method for transferring the pixel signal Sg and the temperature measurement value St of the solid state imaging device.

In FIG. 8, a plurality of horizontal transfer buses BS for transferring the pixel signal Sg and the temperature measurement value St are provided in parallel in this solid state imaging device compared with the solid state imaging device in FIG. 2. In the example of FIG. 8, a case is shown in which four horizontal transfer buses BS are provided. Four pixel signals Sg and four temperature measurement values St can be transferred in parallel through the horizontal transfer buses BS. When the number of the horizontal transfer buses BS is four, it is preferred that the sum of the number of the temperature column CDS processing units 3-2 and the number of the image column CDS processing units 3-1 is a multiple of four.

Here, a plurality of horizontal transfer buses BS are provided, so that it is possible to reduce the transfer time of the pixel signals Sg and the temperature measurement values St and speed up correction processing of the pixel signal Sg using the temperature measurement value St.

Second Embodiment

Figure 9:
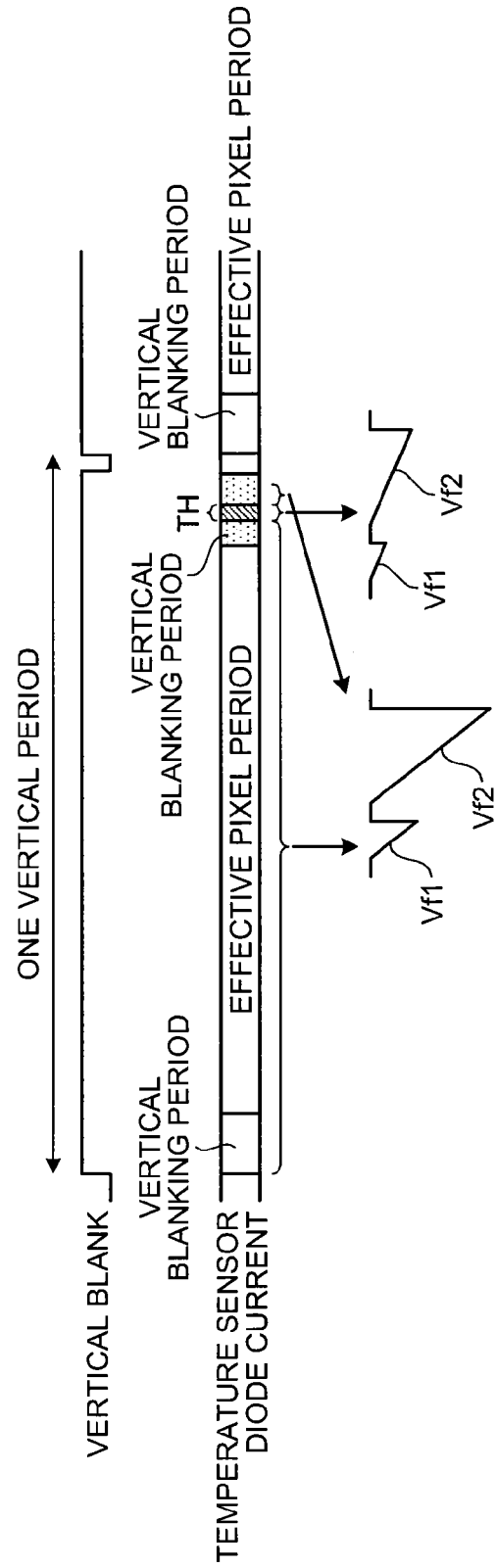
FIG. 9 is a timing chart illustrating a method for changing an analog gain when reading a pixel voltage Vs of a pixel PC of a solid state imaging device and when reading a diode voltage Vt of a temperature sensor 8 according to a second embodiment.

FIG. 9 is a timing chart illustrating a method for changing an analog gain when reading the pixel voltage Vs of the pixel PC of the solid state imaging device and when reading the diode voltage Vt of the temperature sensor 8 according to a second embodiment.

In FIG. 9, for example, the voltage difference value ΔVt is 0.053 (V) at 25° C., and it is smaller than the diode voltage Vt. The voltage change rate per degree is 0.18 mV/° C. To increase a voltage change rate per LSB when the voltage is digitalized, it is necessary to reduce the slopes of the ramp waves Vf1 and Vf2 and increase the analog gain. For example, when the output is 10-bit and the amplitude of the reference voltage VF is 40 mV, the voltage change rate per LSB is (40 mv)/((0.18 mv)*1023)=0.217° C./LSB. Thus, the voltage change rate is 0.217° C. per LSB.

On the other hand, in the image column CDS processing unit 3-1, the analog gain is set by an amount of incident light into the photodiode PD. For example, when the amount of incident light is great, the analog gain is reduced and the slopes of the ramp waves Vf1 and Vf2 increase.

Therefore, to increase the voltage change rate when measuring temperature, it is necessary to differentiate the slopes of the ramp waves Vf1 and Vf2 when measuring temperature from those when performing imaging process. Therefore, when the temperature column CDS processing unit 3-2 is integrated with the image column CDS processing units 3-1, it is not possible to perform temperature measurement and imaging process in one horizontal period.

Therefore, the temperature measurement processing is performed in a vertical blanking period in one vertical period, and the analog gain is increased when the temperature measurement processing is performed, and at the same time, the imaging process is performed in a remaining vertical blanking period and the effective pixel period in the vertical period, and the analog gain can be changed according to the amount of incident light when the imaging process is performed.

Thereby, even when the temperature column CDS processing unit 3-2 is integrated with the image column CDS processing units 3-1, it is possible to appropriately adjust the level of the pixel signal Sg according to the amount of incident light as well as to improve accuracy of the temperature measurement based on the current-voltage characteristics of the diode D.

Further, the temperature measurement processing can be performed once in one horizontal period, so that, when a plurality of horizontal periods are included in one vertical blanking period, the temperature measurement processing can be performed multiple times in one vertical period.

Third Embodiment

Figure 10:
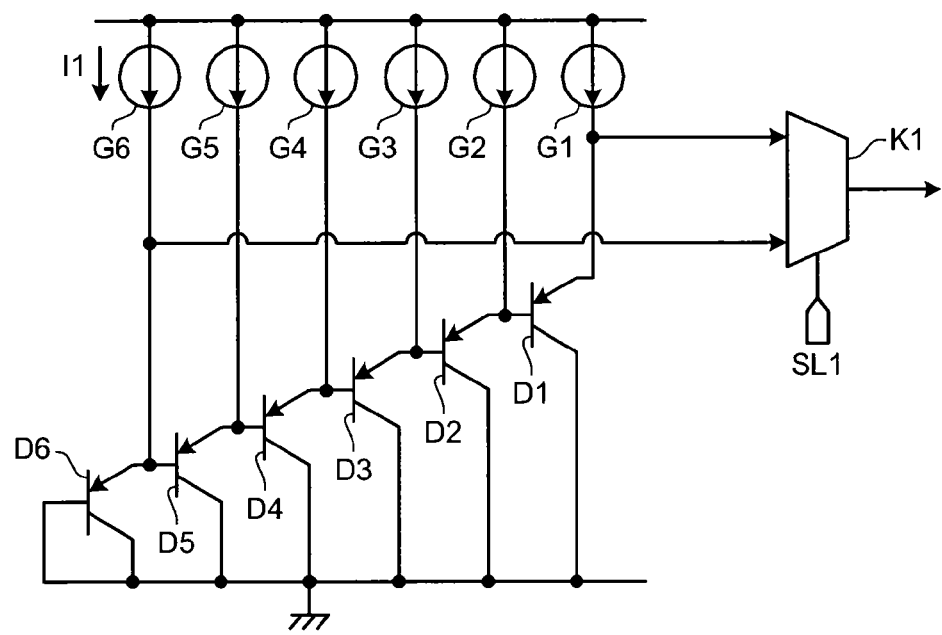
FIG. 10 is a block diagram illustrating a method for switching a current flowing through a temperature sensor 8 according to a third embodiment.

FIG. 10 is a block diagram illustrating a method for switching a current flowing through a temperature sensor 8 according to a third embodiment.

In FIG. 10, the temperature sensor 8 is provided with a plurality of diodes D1 to D6 and a plurality of current sources G1 to G6 for setting diode currents of these diodes D1 to D6 respectively. In the example of FIG. 10, a case is shown in which six diodes D1 to D6 and six current sources G1 to G6 are provided. Here, the currents outputted from the current sources G1 to G6 can be set to I1, and the diode currents of the diodes D1 to D6 can be equal to each other.

The diodes D1 to D6 are connected so that a diode voltage of one diode is received by the next-stage diode. For example, when the diodes D1 to D6 are formed by bipolar transistors, the current sources G1 to G6 can be connected to the emitters of the bipolar transistors and the ground potential can be connected to the collectors of the bipolar transistors. The base of each bipolar transistor can be connected to the emitter of the next-stage bipolar transistor. However, the ground potential can be connected to the emitter of the last-stage bipolar transistor.

The temperature sensor 8 is provided with a selector K1. The selector K1 can switch between an emitter potential of the first-stage diode D1 and an emitter potential of the last-stage diode D6 on the basis of a switching signal SL1 and output one of them.

Here, the emitter potential of the diode D1 is the emitter potential of the diode D6 when a current six times the current I1 is passed through the diode D6. Therefore, when a current six times the current I1 is defined as I2, it is possible to switch between the current I1 and the current I2 at the same timing as that in FIG. 5 by switching the selector K1. Therefore, it is possible to change the diode current of the temperature sensor 8 while the currents outputted from the current sources G1 to G 6 are fixed to I1, so that the circuit configuration can be simplified compared with a case in which the current outputted from the current source G is changed.

Fourth Embodiment

FIG. 11 is a block diagram illustrating a schematic configuration of a solid state imaging device according to a fourth embodiment.

The solid state imaging device in FIG. 11 is formed by adding an amplifier 12 to the solid state imaging device in FIG. 2. Here, the amplifier 12 is inserted between the temperature sensor 8 and the temperature column CDS processing unit 3-2.

Here, the gain of the amplifier 12 can be set in advance so that the voltage difference value $\Delta Vt$ is substantially the same as the pixel voltage Vs during the reset period. For example, although $\Delta Vt=0.054$ (V) when the temperature is 25° C., the pixel voltage Vs during the reset period is about 1.0 V at normal temperature. Thus, the gain of the amplifier 12 can be set to about 16 times because $1.0/0.054 \approx 18.51$.

Thereby, to amplify the voltage difference value $\Delta Vt$, it is not necessary to increase the analog gain of the temperature column CDS processing unit 3-2 and also it is not necessary to change the slopes of the ramp waves Vf1 and Vf2 for the image column CDS processing units 3-1 and the temperature column CDS processing unit 3-2. Therefore, it is possible to perform the temperature measurement processing and the imaging process in one horizontal period, so that it is possible to output the temperature measurement value St for each horizontal period without causing a loss of the pixel signal Sg.

A PGA (programmable gain amplifier) may be used as the amplifier 12, and the gain of the amplifier 12 may be used in conjunction with the analog gain of the image column CDS processing units 3-1. Thereby, any analog gain can be used to perform the A/D conversion processing while the temperature is measured.

Fifth Embodiment

FIG. 12 is a block diagram illustrating a schematic configuration of a solid state imaging device according to a fifth embodiment.

The solid state imaging device in FIG. 12 is formed by adding a plurality of temperature sensors 8 and a selector K2 to the solid state imaging device in FIG. 1. The selector K2 can switch between diode voltages of the plurality of temperature sensors 8 on the basis of a switching signal SL2 and output one of them.

Here, the plurality of temperature sensors 8 are provided in the solid state imaging device, so that it is possible to improve accuracy of the temperature measurement even when the temperature varies in the solid state imaging device.

For example, the temperature sensor 8 can be disposed at a position near a disabled pixel at the beginning of one frame and a position near a disabled pixel at the end of one frame. The temperature sensor 8 can be switched between the temperature measurement during the vertical blanking period at the beginning of one frame and the temperature measurement during the vertical blanking period at the end of one frame. Thereby, it is possible to improve accuracy of image correction in a case such as shading occurs in the vertical direction depending on the temperature.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid state imaging device comprising:
 a pixel array unit in which pixels that accumulate photo-electrically-converted charge are arranged in a matrix form;
 an image CDS(Correlated Double Sampling) processing unit configured to output a pixel signal based on a difference between a pixel voltage read from one of the pixels during a reset period and a pixel voltage read from the one of the pixels during a signal read period;
 a temperature sensor configured to output a diode voltage when a diode current is changed;
 a temperature CDS processing unit configured to output a temperature measurement value based on a difference of the diode voltage at the time when the diode current is changed; and
 a timing generator configured to control the reset period, the signal read period, and timing of changing the diode current of the temperature sensor, wherein temperature measurement processing is performed in a first vertical blanking period in one vertical period, and imaging process is performed in a remaining second vertical blanking period and an effective pixel period in the vertical period, and wherein an analog gain of the temperature measurement processing is set higher than that of the imaging process and the analog gain of the imaging process is controlled according to an amount of incident light.

2. The solid state imaging device according to claim 1, wherein the diode current is changed for each horizontal period.

3. The solid state imaging device according to claim 1, wherein the timing generator changes the diode current of the temperature sensor at the same timing as when changing a period from the reset period to the signal read period.

4. The solid state imaging device according to claim 1, wherein the image CDS processing unit and the temperature CDS processing unit are integrated with each other.

5. The solid state imaging device according to claim 1, wherein the image CDS processing unit and the temperature CDS processing unit have the same configuration.

6. The solid state imaging device according to claim 1, wherein,
 the image CDS processing unit has an image ADC circuit configured to digitalize the pixel signal by performing a first count operation based on a pixel voltage read during the reset period and performing a second count operation based on a pixel voltage read during the signal read period, and
 the temperature CDS processing unit has an temperature ADC circuit configured to digitalize the temperature measurement value by performing a first count operation based on a diode voltage outputted before the diode current is changed and performing a second count operation based on a diode voltage outputted after the diode current is changed.

7. The solid state imaging device according to claim 1, wherein an operation of the temperature CDS processing unit is performed during a vertical blanking period.

8. The solid state imaging device according to claim 1 further comprising:
 an amplifier configured to be inserted between the temperature sensor and the temperature CDS processing unit and amplify the diode voltage.

9. The solid state imaging device according to claim 8, wherein a gain of the amplifier is used in conjunction with an analog gain of the image CDS processing unit.

10. The solid state imaging device according to claim 1, wherein,
 the temperature sensor is provided with a plurality of diodes whose diode currents are equal to each other and which are connected so that a diode voltage of one diode is received by a next-stage diode, and
 the diode current when the diode voltage is outputted is changed by switching a diode from which the diode voltage is extracted.

11. The solid state imaging device according to claim 1, wherein the temperature sensor comprises:
 a diode; and
 a current source configured to be connected to the diode in series and be able to switch a current provided to the diode.

12. The solid state imaging device according to claim 1, wherein the pixel comprises:
 a photodiode configured to perform photoelectric conversion;
 a read transistor configured to transfer a signal from the photodiode to a floating diffusion on the basis of a read signal;
 a reset transistor configured to reset a signal accumulated in the floating diffusion on the basis of a reset signal; and
 an amplifier transistor configured to detect a potential of the floating diffusion.

13. The solid state imaging device according to claim 1, wherein the image CDS processing unit is provided for each column.

14. The solid state imaging device according to claim 1, wherein the image CDS processing unit comprises:
 a comparator configured to compare a signal level read from the pixel with a reference voltage; and
 a counter configured to perform a count operation on the basis of a result of comparison between the signal level and the reference voltage.

15. The solid state imaging device according to claim 1, further comprising:
 a vertical register configured to scan the pixels in a vertical direction; and
 a horizontal register configured to scan the pixels and the temperature sensor in a horizontal direction.

16. The solid state imaging device according to claim 1, wherein, the reset period, the signal read period, and a data transfer period are provided in one horizontal period, and the diode current is set to a first value in the reset period, the diode current is set to a second value in the signal read period, and a temperature measurement value is outputted in the data transfer period via a data transfer bus in which a pixel signal is outputted.

17. The solid state imaging device according to claim 16, wherein a plurality of the data transfer buses are provided in parallel.

18. The solid state imaging device according to claim 1, wherein a plurality of the temperature sensors are provided.

* * * * *